(12) United States Patent
Chen et al.

(10) Patent No.: US 10,190,569 B1
(45) Date of Patent: Jan. 29, 2019

(54) DEVICE FOR AUTOMATICALLY GENERATING ENERGY

(71) Applicant: National Taiwan Normal University, Taipei (TW)

(72) Inventors: Jung-Hsuan Chen, Taipei (TW); Chin-Guo Kuo, Taipei (TW); Chao-Fu Shu, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 0 days.

(21) Appl. No.: 15/726,772

(22) Filed: Oct. 6, 2017

(30) Foreign Application Priority Data

Jul. 25, 2017 (TW) .............................. 106124982 A

(51) Int. Cl.
*F03B 17/04* (2006.01)
*F03B 17/02* (2006.01)
(52) U.S. Cl.
CPC .............. *F03B 17/04* (2013.01); *F03B 17/02* (2013.01); *F03B 17/025* (2013.01); *Y02E 10/20* (2013.01)
(58) Field of Classification Search
CPC ........ F03B 17/04; F03B 17/02; F03B 17/025; Y02E 10/20
USPC ................................ 60/495–507; 290/42, 53
See application file for complete search history.

(56) References Cited

U.S. PATENT DOCUMENTS

| | | | | | |
|---|---|---|---|---|---|
| 2,470,312 | A | * | 5/1949 | Levin | F04F 1/06 60/496 |
| 3,961,479 | A | * | 6/1976 | Anderson | F03B 17/025 60/496 |
| 4,603,551 | A | * | 8/1986 | Wood | B01D 61/10 417/333 |
| 7,322,189 | B2 | * | 1/2008 | Talya | F03B 13/142 60/496 |
| 2012/0317970 | A1 | * | 12/2012 | Edvardsen | F03B 13/189 60/496 |

* cited by examiner

*Primary Examiner* — Hoang M Nguyen
(74) *Attorney, Agent, or Firm* — Muncy, Geissler, Olds & Lowe, P.C.

(57) ABSTRACT

A device for automatically generating energy arranged in a water tank includes a buoy sinking in a water tank. Sides of the buoy are provided with a water inlet and a water outlet, which respectively connect with a tube body and a three-way tube. The tube body and the three-way tube are respectively provided with two valves. Each valve connects with a floating ball. When the buoy sinks in the water tank, each floating ball floats to close the valves, so that the liquid within the buoy is drained from a side through hole of the three-way tube to raise the buoy to a water level of the liquid, and each floating ball looses the valves, and the liquid flows into the buoy through the water inlet, and the buoy sinks in the water tank again. The buoy endlessly floats and sinks to generate electricity.

10 Claims, 5 Drawing Sheets

DEVICE FOR AUTOMATICALLY GENERATING ENERGY

This application claims priority for Taiwan patent application No. 106124982 filed on Jul. 25, 2017, the content of which is incorporated by reference in its entirety.

BACKGROUND OF THE INVENTION

Field of the Invention

The present invention relates to a device for generating power, and more particularly to a device for automatically generating energy that can convert potential energy caused by a floater in a liquid into usable energy.

Description of the Related Art

Nowadays, electricity sources mostly come from thermal power generation caused by firing fossil fuels, or nuclear power generation. However, fossil fuels in the earth have been endlessly consumed, and thermal power generation resulted in air pollution. Unlike thermal power generation and fossil fuels, nuclear power generation achieves the greater efficiency of power generation without causing air pollution. Since nuclear waste produced by nuclear power generation has radioactivity, nuclear power generation faces hidden problems with the health and safety of human bodies. Accordingly, governments in all countries, industries and academic units now actively research green energy that can protect environments to generate power.

Green power generation mostly uses renewable energy, such as water energy, biological energy, solar energy, geothermal energy, and sea energy. Solar power generation and hydroelectric power generation are usually used. In general, hydroelectric power generation converts the potential energy of water into electricity. Its principle is based on the water flow of two different levels due to gravity. For example, water flows from a high-level water source such as a river or a reservoir to a low water level, and then the flowing water pushes a turbine to rotate and drive a generator to generate power.

Hydroelectric power generation is generally based on the change of water levels to push a turbine to generate power. A static water level, such as a lake or a water tank, cannot change its water level. Therefore, the general hydroelectric power generation cannot be widely applied and possesses the low maneuverability.

To overcome the abovementioned problems, the present invention provides a device for automatically generating energy, so as to solve the afore-mentioned problems of the prior art.

SUMMARY OF THE INVENTION

A primary objective of the present invention is to provide a device for automatically generating energy, which endlessly moves a buoy on a static water level to generate potential energy and provides the potential energy for a power generation device to generate power.

Another objective of the present invention is to provide a device for automatically generating energy, which has a simple structure to favor mass production and massively applies to a potential-energy power generation device to provide a lot of power.

To achieve the abovementioned objectives, the present invention provides a device for automatically generating energy arranged in a water tank. The device for automatically generating energy comprises a buoy located in the water tank and sinking in the liquid. The buoy has an accommodation space therein filled with the liquid, and the sides of the buoy are provided with a water inlet and a water outlet, and the water inlet and the water outlet connect with the accommodation space. The water inlet of the buoy connects with a tube body. One valve is located on an end of the tube body opposite to the water inlet. The water outlet connects with a three-way tube provided with a bottom through hole, a top through hole and a side through hole. The bottom through hole connects with the water outlet. The side through hole connects with a drain pipe. Another valve is located on the top through hole. Each of the valves connects with a floating ball. When the buoy is filled with the liquid and sinks in the liquid of the water tank, each floating ball floats to close the valves, so as to prevent the liquid from flowing into the buoy. Meanwhile, the liquid within the buoy is drained from the side through hole of the three-way tube to raise the buoy to a water level of the liquid, and each floating ball looses the valves, and the liquid flows into the buoy through the water inlet to fill the accommodation space, and the buoy sinks in the water tank again. Besides, the buoy connects with a connecting rod arranged on a potential-energy power generation device. When the buoy moves in the water tank, the buoy tows the connecting rod to provide potential energy for the potential-energy power generation device to generate power.

In an embodiment of the present invention, the valve further comprises a case with an inner surface thereof provided with a first convex ring, a second convex ring and a third convex ring from top to bottom. There is an elastic element located between the first convex ring and the second convex ring. The case is provided with a blocking member able to slide therein. The blocking member comprises a first blocking plate located between the bottom of the elastic element and the second convex ring. The bottom of the first blocking plate is provided with a connecting rod to connect with a second blocking plate, and the second blocking plate is located under the third convex ring. The floating ball connects with the top of the first blocking plate through a connecting line. When the floating ball floats, the floating ball pulls the blocking member, and the second blocking plate of the blocking member seals against the third convex ring to close the valve, so as to prevent the liquid from flowing in or out of it.

Below, the embodiments are described in detail in cooperation with the drawings to make easily understood the technical contents, characteristics and accomplishments of the present invention.

DETAILED DESCRIPTION OF THE INVENTION

Figure 1:
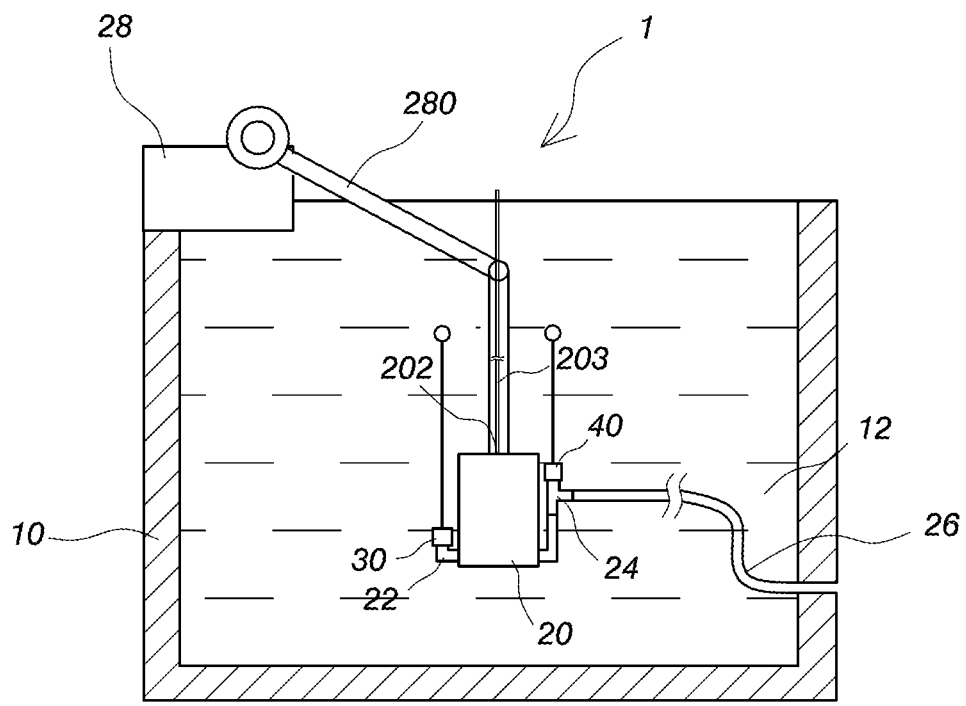
FIG. 1 is a diagram schematically showing a device for automatically generating energy arranged in a water tank according to an embodiment of the present invention.
Figure 2:
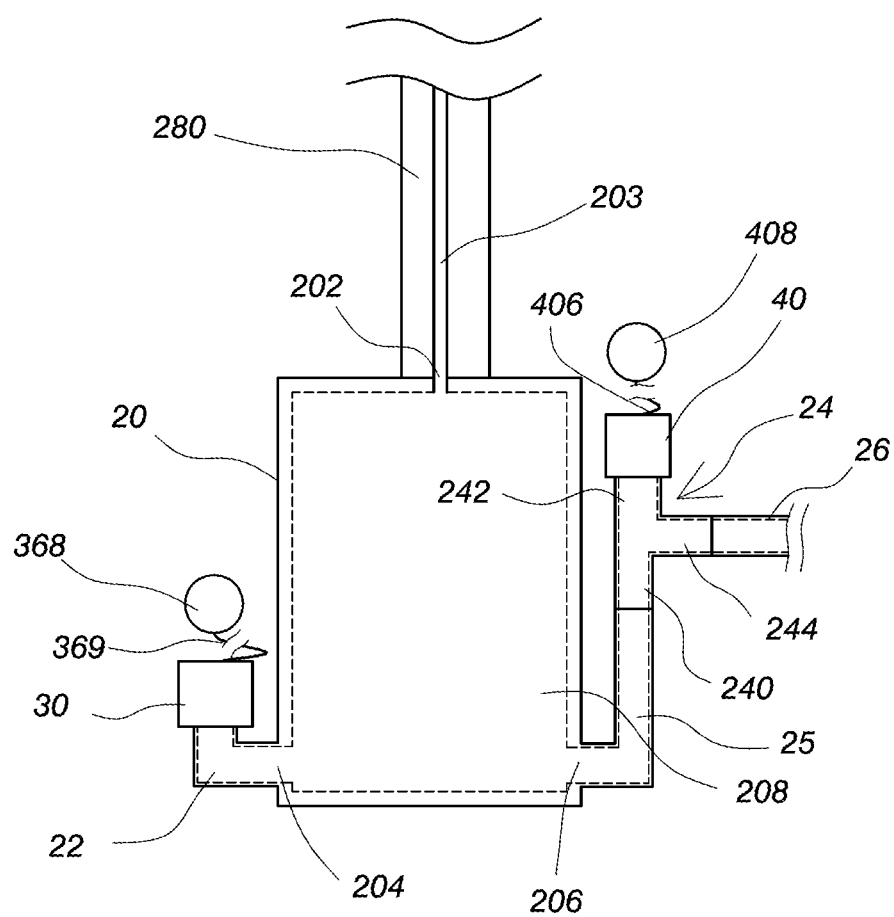
FIG. 2 is a diagram schematically showing a buoy according to an embodiment of the present invention.

Refer to FIG. 1 and FIG. 2. The device 1 for automatically generating energy of the present invention is introduced in detail. The device 1 for automatically generating energy arranged in a water tank 10 that contains a liquid 12, such as water. The device 1 for automatically generating energy comprises a buoy 20. The top of the buoy 20 further comprises an exhaust hole 202 connecting with an exterior of the water tank 10 through an exhaust pipe 203, so as to circulate gas in the buoy 20 and an external space. The sides of the buoy 20 are provided with a water inlet 204 and a water outlet 206, wherein the water inlet 204 and the water outlet 206 are close to the bottom of the buoy 20. The buoy 20 has an accommodation space 208 therein that connects with the water inlet 204 and the water outlet 206. The water inlet 204 of the buoy 20 is provided with a tube body 22, such as an L-shaped tube body. The end of the tube body 22 opposite to the water inlet 204 is provided with one valve 30. The water outlet 206 of the buoy 20 is provided with a three-way tube 24. The three-way tube 24 is provided with a bottom through hole 240, a top through hole 242 and a side through hole 244. The bottom through hole 240 connects with the water outlet 206 of the buoy 20. An L-shaped water tube 25 is connected between the bottom through hole 240 and the water outlet 206 to extend toward the top of the buoy 20, whereby the side through hole 244 is close to the top of the buoy 20. Thus, before the liquid 12 in the buoy 20 reaches the height of the side through hole 244, the liquid 12 stays in the buoy 20. The side through hole 244 connects with a drain pipe 26. The outlet of the drain pipe 26 is located outside the water tank 10. The height of the outlet of the drain pipe 26 is lower than the height of the side through hole 244 of the buoy 20 sinking in the water tank 10. After the buoy 20 sinks in the water tank 10 due to atmospheric pressure, the liquid 12 in the buoy 20 flows to the drain pipe 26. In an embodiment, the drain pipe 26 is a soft pipe. The soft pipe does not easily affect the buoy 20 floating in the liquid 12 and helps adjust the position of the outlet of the drain pipe 26, thereby controlling water quantity drained from the buoy 20. The top through hole 242 of the three-way tube 24 is provided with another valve 40. The buoy 20 connects with a potential-energy power generation device 28. The potential-energy power generation device 28 is provided with a connecting rod 280 to connect with the buoy 20. When the buoy 20 moves in the water tank 10, the buoy 20 tows the connecting rod 280 to provide potential energy for the potential-energy power generation device 28 to generate power.

Figure 3:
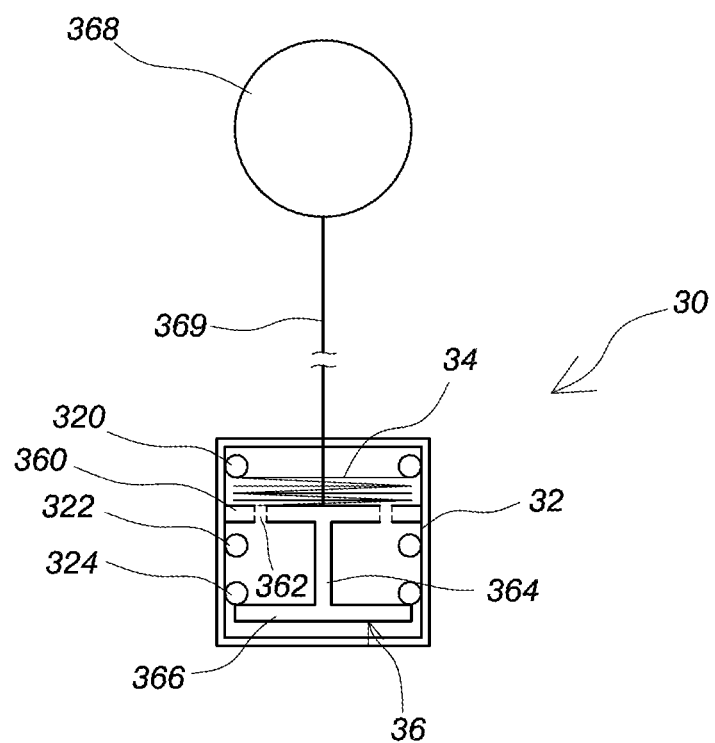
FIG. 3 is a cross-sectional diagram schematically showing a valve according to an embodiment of the present invention.

Refer to FIG. 3. The valves 30 and 40 located on the tube body 22 and the three-way tube 24 are introduced in detail. The valves 30 and 40 are one-way valve, so that the liquid 12 flows in one direction. The structures of the valves 30 and 40 are identical. Taking the valve 30 as an example. The valve 30 comprises a case 32 having a shape of a cylinder. The inner surface of the case 32 provided with a first convex ring 320, a second convex ring 322 and a third convex ring 324 from top to bottom. The first convex ring 320, the second convex ring 322 and the third convex ring 324 are water-proof rubber bands. The case 32 is provided with an elastic element 34 therein. The elastic element 34 may be a spring. The elastic element 34 is located between the first convex ring 320 and the second convex ring 322. The case 32 is provided with a blocking member 36 therein. The blocking member 36 slides in the case 32. The blocking member 36 comprises a first blocking plate 360 located between the bottoms of the elastic element 34 and the second convex ring 322. The bottom of the first blocking plate 360 is provided with a connecting rod 364 to connect with a second blocking plate 366 located under the third convex ring 324. The position of the blocking member 36 in the case 32 is controlled by a floating ball 368. The floating ball 368 connects with the top of the first blocking plate 360 through a connecting line 369. When the floating ball 328 floats, the floating ball 368 pulls the blocking member 36, and the second blocking plate 366 of the blocking member 36 seals against the third convex ring 324. The first blocking plate 360 and the second blocking plate 366 are circular blocking plates that match the case 32 being a cylinder. The second blocking plate 366 is annularly provided with a water-proof rubber band (not shown). As a result, when the second blocking plate 366 touches the third convex ring 324, they are effectively dovetailed into each other to avoid a leak of water and close the valve 30.

Figure 4:
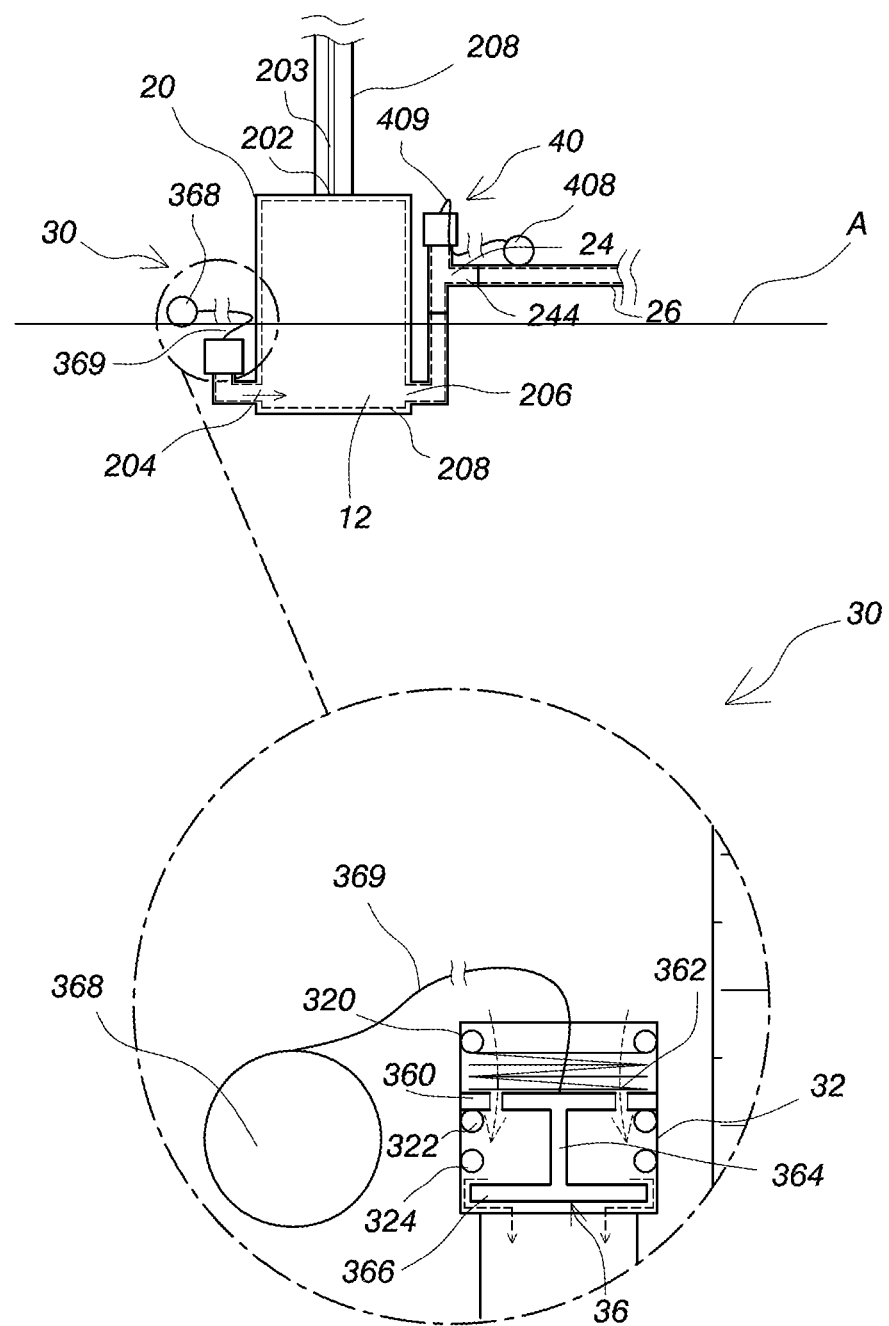
FIG. 4 and FIG. 5 are diagrams schematically showing continuous states of using a device for automatically generating energy according to an embodiment of the present invention.

After describing the structure of the device 1 for automatically generating energy, refer to FIG. 1 and FIG. 4 to detail the state of using the device 1 for automatically generating energy of the present invention. Firstly, the buoy 20 is placed in the water tank 10, whereby the buoy 20 floats on a water level A. When the valve 30 is located in the water tank 10, the buoy 20 sinks in the liquid 12 due to the weight of the buoy 20. The floating ball 368 is loose. Certainly, the floating ball 408 also looses the valve 40. The internal structures of the valves 30 and 40 are identical. Thus, taking the structure of the valve 30 as an example. After the floating balls 368 and 408 loose the valves 30, the tension of the elastic element 34 in the valve 30 pushes off the blocking member 36. Thus, the second blocking plate 366 of the blocking member 36 leaves the third convex ring 324, and the liquid 12 flows into the valves 30. The liquid 12 flows into the buoy 20 through the drain holes 362 of the first blocking plate 360 and the water inlet 204. Since the connecting line 369 is sufficiently long, the valve 30 remains open such that the liquid 12 flows into the buoy 20 before a depth that the buoy 20 sinks exceeds the length of the connecting line 369. When a depth that the buoy 20 sinks is equal to the length of the connecting line 369, the valve 30 is pulled and closed. In addition, since the side through hole 244 of the buoy 20 is close to the top of the buoy 20, the liquid 20 endlessly flows into the buoy 20 when the liquid 12 in the buoy 20 does not reach the height of the side through hole 244. Thus, the buoy 20 can receive the liquid 12 and sink in the water tank 10.

Figure 5:
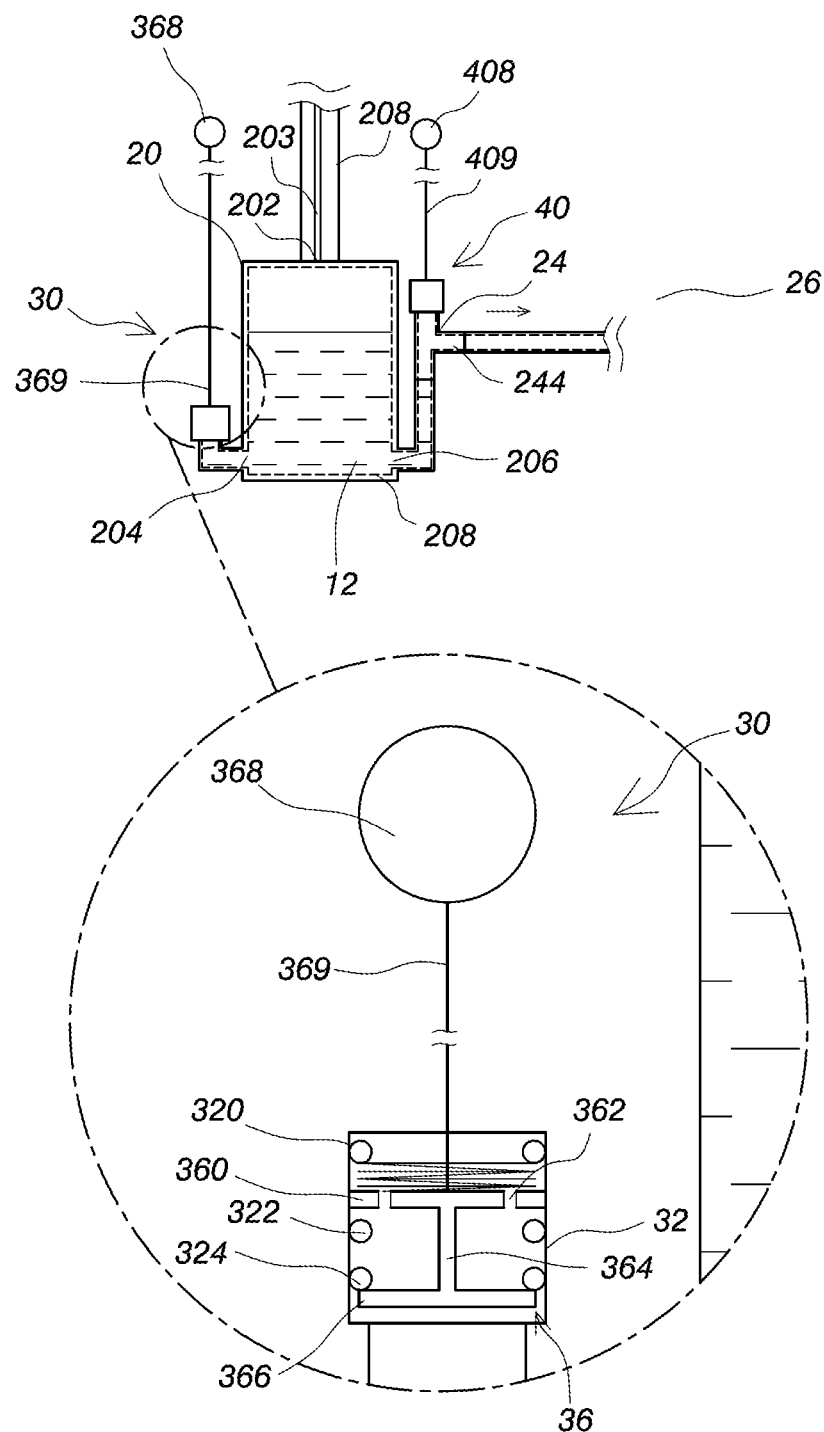

Refer to FIG. 1 and FIG. 5. When the buoy 20 sinks in the water tank 10, the floating balls 368 and 408 float up and the depth that the buoy 20 sinks is equal to the lengths of the connecting lines 369 and 409. Due to the buoyancy of the floating balls 368 and 408, the floating balls 368 and 408 pull and close the valves 30 and 40. The internal structures of the valves 30 and 40 are the same. Thus, taking the structure of the valve 30 as an example. The connecting lines 369 and 409 pull the blocking members 36 in the valves 30 and 40, whereby the first blocking plate 360 of the blocking member 36 pushes against the elastic element 34 and the second blocking plate 366 seals against the third convex ring 324 to block channels in the case 32. As a result, the liquid 12 does not flow into the buoy 20 through the water inlet 204 and cannot be drained from the water outlet 206. The valves 30 and 40 are closed and only the water outlet 206 of the buoy 20 and the side through hole 244 of the three-way tube 24 are open. Refer to FIG. 1. The height of the outlet of the drainpipe 26 connecting with the side through hole 244 is lower than the height of the buoy 20 sinking in water, Due to atmospheric pressure and a fact that only the side through hole 244 is open, the liquid 12 in the buoy 20 is drained only from the side through hole 244. When the liquid 12 is drained, external gas is inputted to the exhaust hole 202 at the top of the buoy 20 through the exhaust tube 203, whereby the buoy 20 is filled with air and raised to the water level. Afterwards, the floating ball 368 looses the valve 30 so that water flows into the valve 30. Therefore, the buoy of the present invention endlessly floats and sinks to provide potential energy for the potential-energy power generation device 28 to generate power.

In conclusion, the buoy of the present invention endlessly moves in static water to generate potential energy and provides it for the power generation device to generate power. The present invention has a simple structure to favor mass production and massively applies to the potential-energy power generation device to provide a lot of power.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A device for automatically generating energy arranged in a water tank, said water tank containing a liquid, and said device for automatically generating energy comprising:
    a buoy located in said water tank and sinking in said liquid, and said buoy has an accommodation space therein filled with said liquid, and sides of said buoy are provided with a water inlet and a water outlet, and said water inlet and said water outlet connect with said accommodation space;
    a tube body with an end connecting with said water inlet of said buoy;
    a three-way tube provided with a bottom through hole, a top through hole and a side through hole, and said bottom through hole connects with said water outlet of said buoy, and said side through hole connects with a drain pipe, and an outlet of said drain pipe is located outside said water tank;
    two valves, and one of said valves located on an end of said tube body opposite to said water inlet, and another of said valves is located on said top through hole of said three-way tube, and each of said valves connects with a floating ball, and when said buoy is filled with said liquid and sinks in said liquid of said water tank, each said floating ball floats to close said valves, so as to prevent said liquid from flowing into said buoy, and said liquid within said buoy is drained from said side through hole of said three-way tube to raise said buoy to a water level of said liquid, and each said floating ball looses said valves, and said liquid flows into said buoy through said water inlet to fill said accommodation space, and said buoy sinks in said water tank again; and
    a potential-energy power generation device provided with a connecting rod to connect with said buoy, and when said buoy moves in said water tank, said buoy tows said connecting rod to provide potential energy for said potential-energy power generation device to generate power.

2. The device for automatically generating energy according to claim 1, wherein said valve is a one-way valve.

3. The device for automatically generating energy according to claim 1, wherein said valve further comprises:
    a case with an inner surface thereof provided with a first convex ring, a second convex ring and a third convex ring from top to bottom;
    an elastic element located in said case and between said first convex ring and said second convex ring; and
    a blocking member sliding in said case, and said blocking member comprises a first blocking plate, and said first blocking plate is located between said elastic element and said second convex ring, and a bottom of said first blocking plate is provided with a connecting rod to connect with a second blocking plate, and said second blocking plate is located under said third convex ring.

4. The device for automatically generating energy according to claim 3, wherein said floating ball connects with a top of said first blocking plate through a connecting line, and when said floating ball floats, said floating ball pulls said blocking member, and said second blocking plate of said blocking member seals against said third convex ring to close said valve.

5. The device for automatically generating energy according to claim 3, wherein said first blocking plate and said second blocking plate are circular blocking plates.

6. The device for automatically generating energy according to claim 3, wherein said first blocking plate is further provided with at least one drain hole.

7. The device for automatically generating energy according to claim 3, wherein said elastic element is a spring.

8. The device for automatically generating energy according to claim 3, wherein said first convex ring, said second convex ring and said third convex ring are water-proof rubber bands.

9. The device for automatically generating energy according to claim 1, wherein said tube body is an L-shaped tube body.

10. The device for automatically generating energy according to claim 1, wherein a top of said buoy further comprises an exhaust hole connecting with an exterior of said water tank through an exhaust pipe.

* * * * *